United States Patent
Zuin et al.

(10) Patent No.: US 6,550,684 B1
(45) Date of Patent: Apr. 22, 2003

(54) CHIP CARD EJECTOR SYSTEM

(75) Inventors: Gianni Zuin, Mestrino-Padova (IT); Robert Martucci, Montegrotto Terme Padova (IT)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/615,090

(22) Filed: Jul. 12, 2000

(30) Foreign Application Priority Data

Jul. 26, 1999 (EP) .............................. 99114616

(51) Int. Cl.⁷ ................................. G06K 7/00
(52) U.S. Cl. ................. 235/486; 235/487; 235/479
(58) Field of Search ................. 235/475, 479, 235/485, 486, 487, 435, 441, 443, 482

(56) References Cited

U.S. PATENT DOCUMENTS

| | | | | |
|---|---|---|---|---|
| 4,187,980 A | * | 2/1980 | Schisselbauer et al. ..... | 235/474 |
| 4,724,310 A | * | 2/1988 | Shimamura et al. ........ | 235/483 |
| 4,794,242 A | * | 12/1988 | Grassl et al. ............... | 235/482 |
| 4,904,852 A | * | 2/1990 | Mita et al. .................. | 235/479 |
| 4,926,032 A | * | 5/1990 | Shimamura et al. ........ | 235/441 |
| 4,976,630 A | * | 12/1990 | Schuder et al. ............. | 235/482 |
| 5,036,184 A | * | 7/1991 | Sasaki ........................ | 235/479 |
| 5,107,099 A | * | 4/1992 | Smith ......................... | 235/449 |
| 5,196,687 A | * | 3/1993 | Sugino et al. ............... | 235/483 |
| 5,202,551 A | * | 4/1993 | Parreer et al. ............... | 235/486 |
| 5,231,274 A | * | 7/1993 | Reynier et al. .............. | 235/441 |
| 5,336,877 A | * | 8/1994 | Raab et al. .................. | 235/475 |
| 5,389,001 A | * | 2/1995 | Broschard, III et al. .... | 439/159 |
| 5,432,327 A | | 7/1995 | Price .......................... | 235/448 |
| 5,554,840 A | | 9/1996 | Saroya ........................ | 235/441 |
| 5,563,400 A | | 10/1996 | Le Roux ..................... | 235/486 |
| 5,796,085 A | * | 8/1998 | Bleier ......................... | 235/441 |
| 5,823,828 A | | 10/1998 | Bricaud et al. ............. | 439/630 |
| 5,837,984 A | * | 11/1998 | Bleier et al. ................. | 235/441 |
| 5,844,681 A | * | 12/1998 | Alessi et al. ................ | 356/319 |
| 5,877,488 A | * | 3/1999 | Klatt et al. .................. | 235/486 |
| 5,984,184 A | * | 11/1999 | Kojima ....................... | 235/441 |
| 6,011,937 A | * | 1/2000 | Chaussade et al. ........... | 399/24 |
| 6,018,669 A | * | 1/2000 | Stoegmueller ............... | 235/441 |
| 6,075,706 A | * | 6/2000 | Learmonth et al. ......... | 235/441 |
| 6,095,868 A | * | 8/2000 | Hyland et al. .............. | 439/630 |
| 6,112,994 A | * | 9/2000 | Hyland ........................ | 235/486 |
| 6,149,064 A | * | 11/2000 | Yamaoka et al. ........... | 235/479 |
| 6,168,082 B1 | * | 1/2001 | Benjamin et al. ............ | 235/475 |
| 6,210,193 B1 | * | 4/2001 | Ito et al. ..................... | 439/326 |

FOREIGN PATENT DOCUMENTS

| | | | |
|---|---|---|---|
| EP | 0476892 A1 | * | 3/1992 |
| FR | 2607287 A1 | * | 5/1988 |
| FR | 2607290 A1 | * | 5/1988 |

* cited by examiner

Primary Examiner—Karl D. Frech
Assistant Examiner—Uyen-Chau Le
(74) Attorney, Agent, or Firm—Stacey E. Caldwell

(57) ABSTRACT

A system is disclosed for guiding an IC card into and ejecting the card from a card reading apparatus which includes an electrical connector having at least one terminal for engaging at least one contact on the card. A frame has the connector mounted therewithin. A slider receives the card. The slider has guide means for guiding insertion of the card in a direction of mating the card with the connector. The slider is movably mounted relative to the frame for moving the card therewith away from the connector and ejecting the card from the apparatus.

10 Claims, 3 Drawing Sheets

CHIP CARD EJECTOR SYSTEM

FIELD OF THE INVENTION

This invention generally relates to the art of IC card reading apparatus and, particularly, to a system for guiding a chip card into and ejecting the card from the apparatus.

BACKGROUND OF THE INVENTION

Chip (IC) cards come in a variety of shapes and sizes but typically comprise a card of approximately the same size as a standard credit card. The IC card itself contains intelligence in the form of a memory circuit or other electronic program. A card reader reads the information or memory stored on the card.

IC cards are used in countless applications in today's electronic society, including ATMs, cable television decoders, cellular telephones, PC card adapters and other electronic applications. One such chip card is identified as a "Multi Media Card" or "MMC" which is an IC card for use in PC's for media applications such as adapters, music players, toys, games, cellular phones and digital cameras. The MMC card reader accommodates insertion and removal of the card to provide quick access to the information and programs on these cards.

One of the problems with card reading apparatus is in manually manipulating the card for insertion into and ejection from the apparatus. This is due, in part, to the small size of the card, itself. Heretofore, rather elaborated and sometimes complicated insertion and/or ejector mechanisms have been added to card readers to facilitate manipulation of the cards. Unfortunately, such elaborate ejector mechanisms add both to the size and cost of the overall card reader. The present invention is directed to solving these problems by providing a very simple, efficient and cost effective means for manipulating such cards into and out of card readers.

SUMMARY OF THE INVENTION

An object, therefore, of the invention is to provide a new and improved system for guiding a chip (IC) card into and ejecting the card from a card reading apparatus which includes an electrical connector having at least one terminal for engaging at least one contact on a surface of the card.

In the exemplary embodiment of the invention, a frame assembly mounts the connector therewithin. A slider member receives the card and has guide means for guiding insertion of the card in a direction of mating the card with the connector. The slider member is movably mounted relative to the frame assembly for moving the card therewith away from the connector and ejecting the card from the reading apparatus.

As disclosed herein, the frame assembly includes an outer frame mounting a printed circuit board on which the connector is mounted, along with a cover for the frame assembly. Complementary interengaging rail-and-groove means are provided between the slider member and the printed circuit board for guiding movement of the slider member toward and away from the connector. The outer frame includes a slot for receiving the card. The slot is aligned with the connector, and the slider member is movable between the slot and the connector. The cover has an access opening aligned with at least a portion of the slider member to allow for manipulation of the slider member through the access opening. The cover is fabricated of metal material for shielding purposes.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
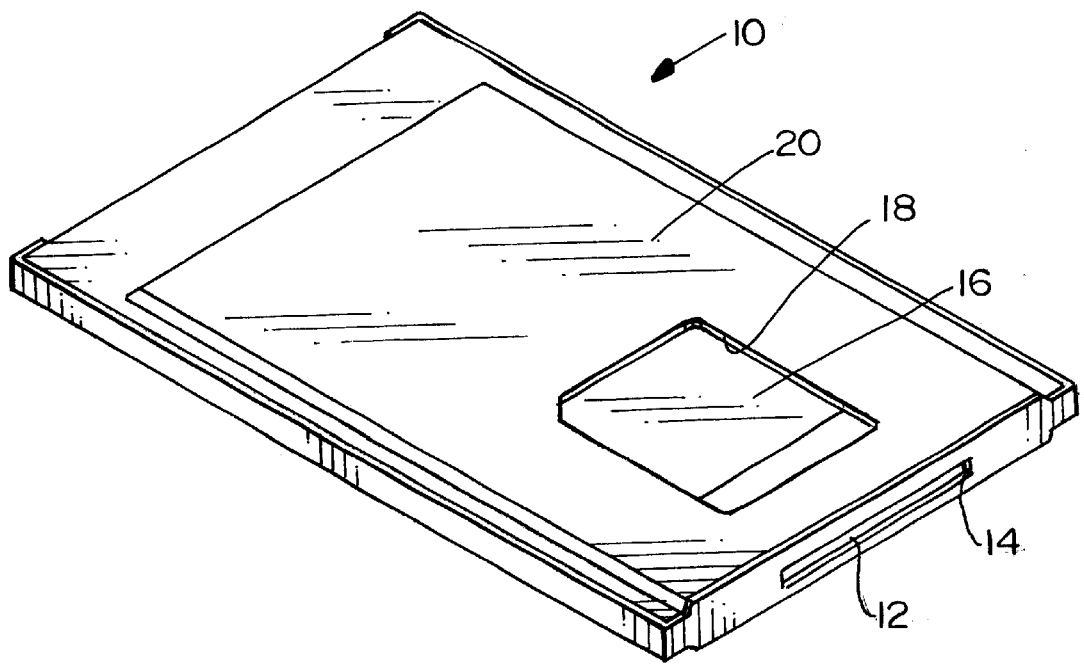
FIG. 1 is top perspective view of a card reading apparatus according to the invention, with the chip card inserted into the apparatus.
Figure 2:
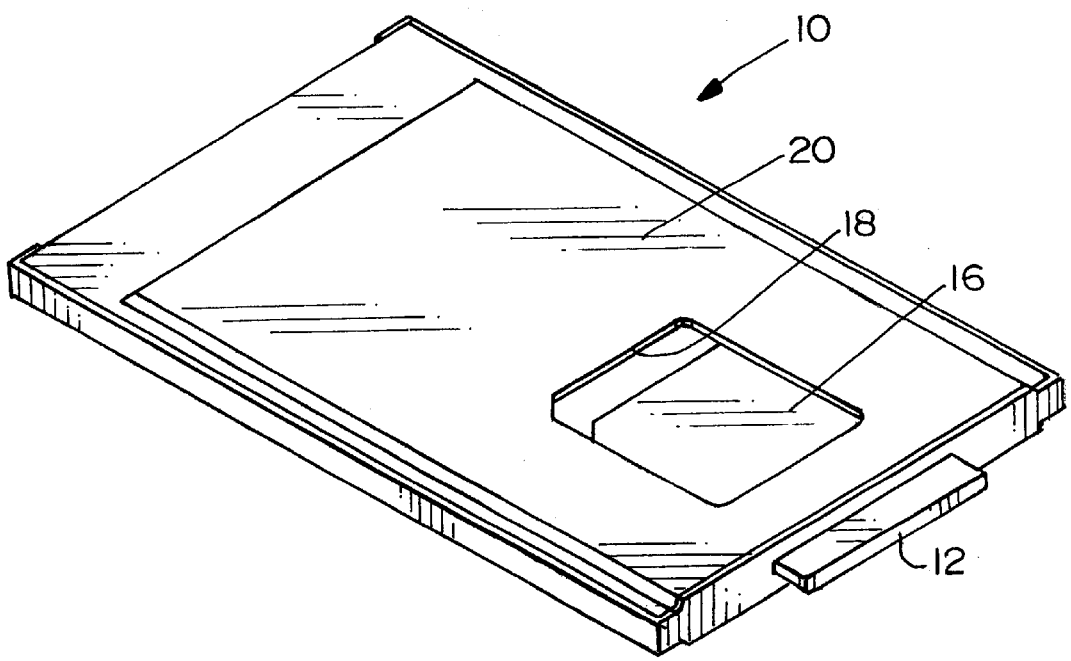
FIG. 2 is a view similar to that of FIG. 1, with the slider having ejected the card outwardly of the apparatus.

Referring to the drawings in greater detail, and first to FIGS. 1 and 2, the invention is illustrated in an IC card reading apparatus or card reader, generally designated 10, which receives a chip (IC) card 12 through a front slot 14 of the reader. The chip card may be a "Multi Media Card" or "MMC". A slider member 16 is exposed through an access opening 18 in a top cover 20 of the reader. As will seen hereinafter, slider 16 is effective to guide card 12 toward an interior electrical connector and for ejecting the card from the reader as seen in FIG. 2.

Figure 3:
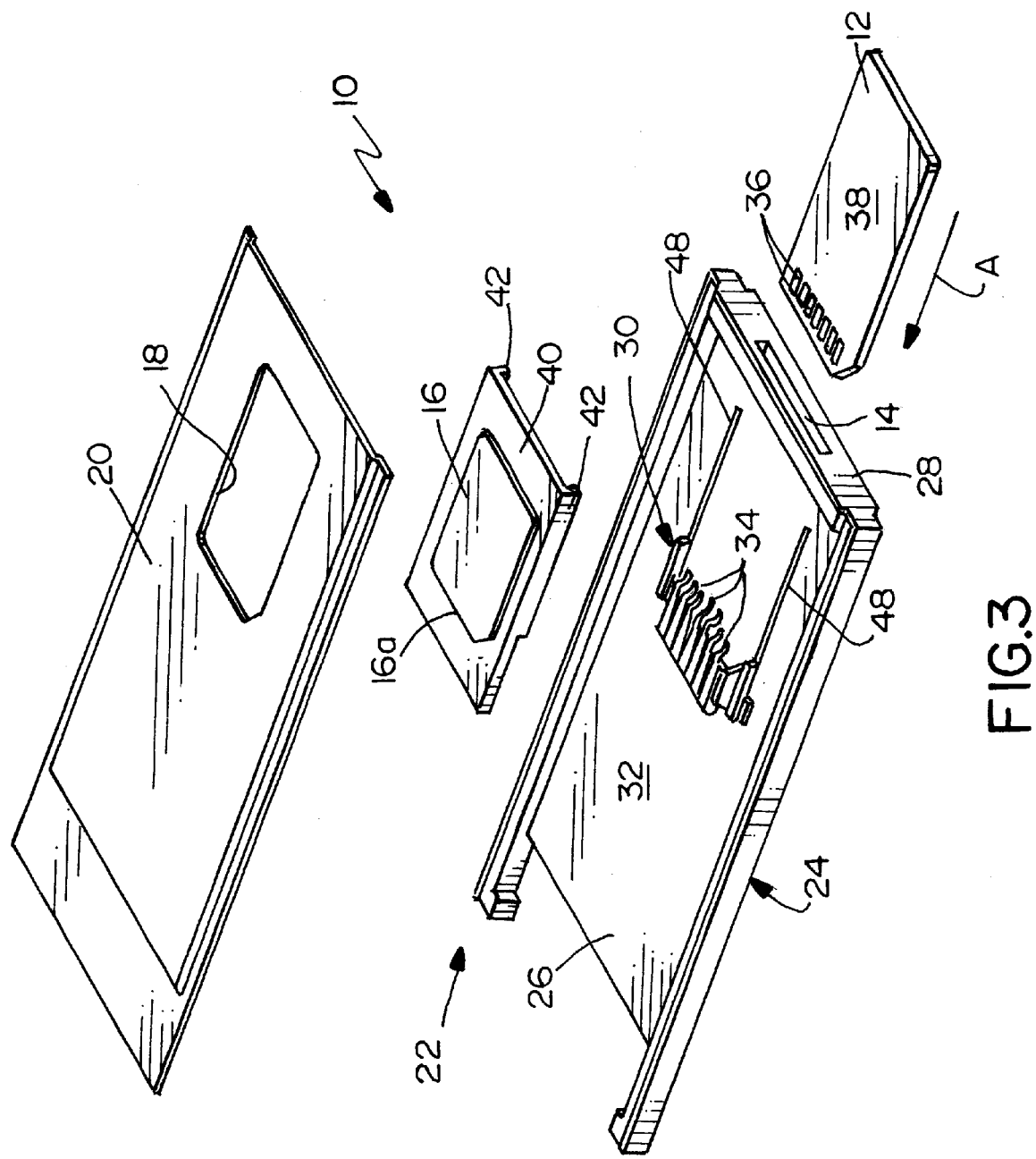
FIG. 3 is an exploded perspective view of the apparatus.

More particularly, referring to FIG. 3 in conjunction with FIGS. 1 and 2, card reader 10 includes a frame assembly, generally designated 22, which is formed by a generally U-shaped outer frame, generally designated 24, surrounding and mounting a printed circuit board 26, with top cover 20 adhered to the top of outer frame 24. The outer frame may be molded of plastic material, and cover 20 preferably is fabricated of sheet metal material for shielding purposes. Slot 14 for card 12 is formed in a front cross portion 28 of the U-shaped frame 24.

An electrical connector, generally designated 30, is mounted on a top surface 32 of printed circuit board 26. The connector includes a plurality of terminals 34 for engaging respective ones of a plurality of contacts 36 on a top surface 38 of card 12. The card is inserted into slot 14 in the direction of arrow "A" (FIG. 3) until contacts 36 engage terminals 34 which, in turn, are connected to appropriate circuit traces on printed circuit board 26. Since the card contains intelligence in the form of a memory circuit or other electronic program, connector 30 thereby "reads" the card and transfers the information to printed circuit board 32.

Figure 4:
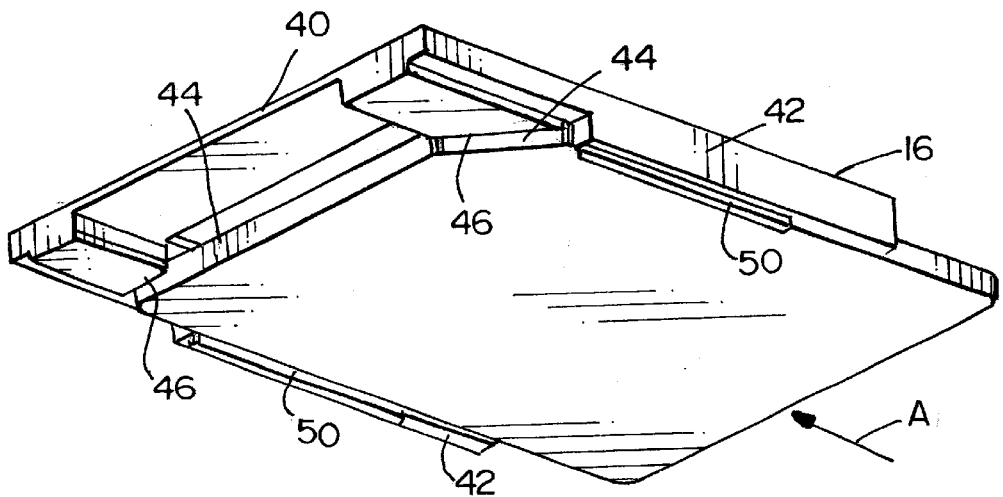
FIG. 4 is a bottom perspective view of the slider with the card mounted therein.

Referring to FIG. 4 in conjunction with FIG. 3, slider 16 has a top wall 40 and a pair of side walls or flanges 42 which are effective to receive card 12 therebetween. The card is inserted in the direction of arrows "A" until front edges 44 of the card abut against stop shoulders 46 formed on the bottom the slider. Therefore, when the card is pushed into slot 14, the card will push the slider therewith toward connector 30, as the slider guides the card in a direction of mating with the connector.

Generally, complementary interengaging rail-and-groove means are provided between slider 16 and printed circuit board 26 for guiding movement of the slider toward and away from connector 30. More particularly, as seen best in FIG. 3, printed circuit board 26 has a pair of laterally spaced grooves 48 formed therein. The grooves extend in a direction between slot 14 which receives card 12 and connector 30. As best seen in FIG. 4, slider 16 has a pair of laterally spaced rails 50 protruding downwardly from the bottoms of side walls 42 for engagement within grooves 48 in the printed circuit board. With rails 50 disposed in grooves 48, slider 16 is effective to guide contacts 36 on card 12 into engagement with terminals 34 of connector 30 when the card is inserted into slot 14 of the reader frame assembly. When cover 20 is adhered to frame 24, the cover holds the slider down on the printed circuit board, with rails 50 in grooves 48.

As stated above, slider 16 is exposed through access opening 18 in top cover 20. Actually, a slightly raised portion 16a of the slider may project through the access opening, with the raised portion having a height of approximately the thickness of the sheet metal material of the cover. Therefore, when it is desired to eject card 12 from reader 10, and operator simply engages slider 16, as by a person's thumb, to slide the card from its interior position shown in FIG. 1 to the ejected position shown in FIG. 2.

Figure 5:
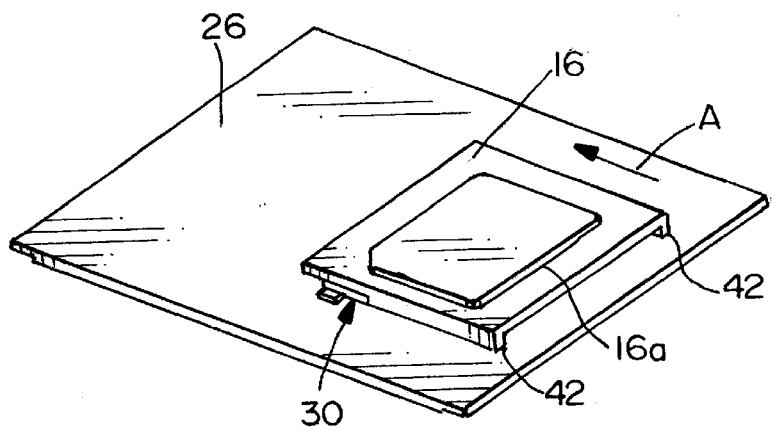
FIG. 5 is a perspective view of the slider, connector and printed circuit isolated from the other components of the apparatus and without the card.
Figure 6:
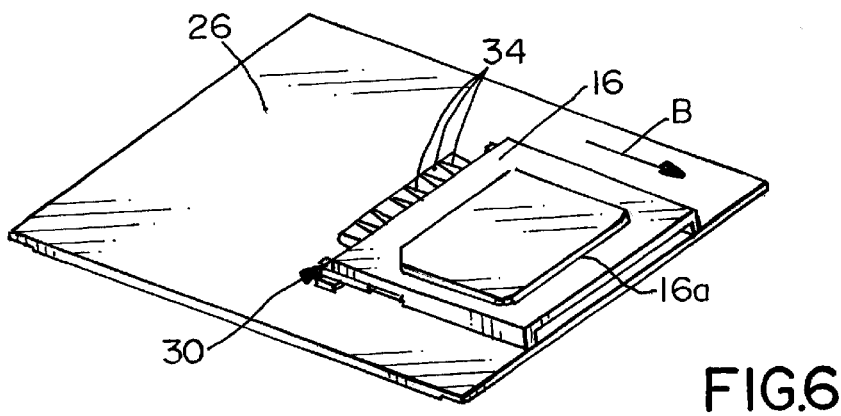
FIG. 6 is a view similar to that of FIG. 5, with the slider moved to its ejecting position.

This sliding action of slider 16 is shown in FIGS. 5 and 6, in the absence of card 12. More particularly, FIG. 5 shows slider 16 having been moved in the direction of arrow "A", relative to printed circuit board 26. This represents the connected or "reading" position of the card. FIG. 6 shows slider 16 having been moved in the direction of arrow "B" to effect ejection of the card. The ejected position of the card corresponding to the position of slider 16 in FIG. 6, is shown in FIG. 2. The card now can be grasped by an operator to fully remove the card from the reader.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A system for guiding an IC card into and ejecting the card from an IC card reading apparatus, comprising:

a frame assembly including a slot for receiving the card in a mating card-reading position substantially entirely within an interior of the frame assembly, the frame assembly including a cover having an access opening;

an electrical connector mounted substantially entirely within the interior of the frame assembly, the electrical connector being immovable relative to the frame assembly; and a slider member mounted within the interior of the frame assembly for receiving the card, the slider member having guide means for guiding insertion of the card through the slot in a direction of mating the card with the electrical connector, the slider member being movably mounted relative to the frame assembly and to the electrical connector and ejecting the card from the apparatus, and a portion of the slider member being exposed through the access opening in the cover to allow for manipulation of the slider member through the access opening from the exterior of the frame assembly.

2. The system of claim 1 wherein said cover has an exterior surface and said portion of the slider member exposed through the access opening is generally flush with said exterior surface.

3. The system of claim 1 wherein said frame assembly includes an outer frame mounting a printed circuit board on which the electrical connector is mounted.

4. The system of claim 3, including complementary interengaging rail-and-groove means between the slider member and the printed circuit board for guiding movement of the slider member toward and away from the electrical connector.

5. The system of claim 4, wherein said rail-and-groove means comprise at least one guide rail on the slider member movable in a groove in the printed circuit board between the slot and the electrical connector.

6. The system of claim 1 wherein said cover is fabricated of metal material for shielding purposes.

7. A system for guiding an IC card into and ejecting the card from an IC card reading apparatus, comprising:

a frame assembly including an outer frame mounting a printed circuit board and including a slot for receiving the card in a mating card-reading position substantially entirely within an interior of the frame assembly, the frame assembly including a cover having an access opening;

an electrical connector mounted on the printed circuit board substantially entirely within the interior of the frame assembly, the electrical connector being immovable relative to the frame assembly and printed circuit board;

a slider member mounted within the interior of the frame assembly for receiving the card, the slider member having guide means for guiding insertion of the card through the slot in a direction of mating the card with the electrical connector; and complementary interengaging rail-and-groove means between the slider member and the printed circuit board for guiding movement of the slider member relative to the frame assembly and to the electrical connector for moving the card therewith away from the electrical connector and ejecting the card from the apparatus, and a portion of the slider member being exposed through the access opening in the cover to allow for manipulation of the slider member through the access opening from the exterior frame assembly.

8. The system of claim 7 wherein said cover has an exterior surface and said portion of the slider member exposed through the access opening is generally flush with said exterior surface.

9. The system of claim 7 wherein said rail-and-groove means comprise at least one guide rail on the slider member movable in a groove in the printed circuit board between the slot and the electrical connector.

10. The system of claim 7 wherein said cover is fabricated of metal material for shielding purposes.

* * * * *